W. A. BARKER.
MECHANICAL MOVEMENT.
APPLICATION FILED APR. 12, 1915.
1,178,702.
Patented Apr. 11, 1916.
2 SHEETS—SHEET 1.
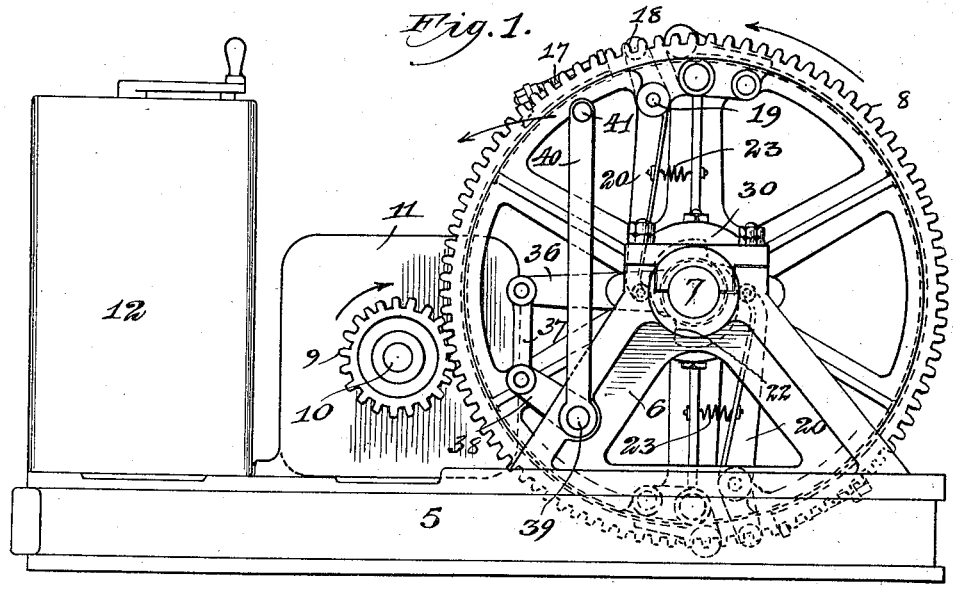
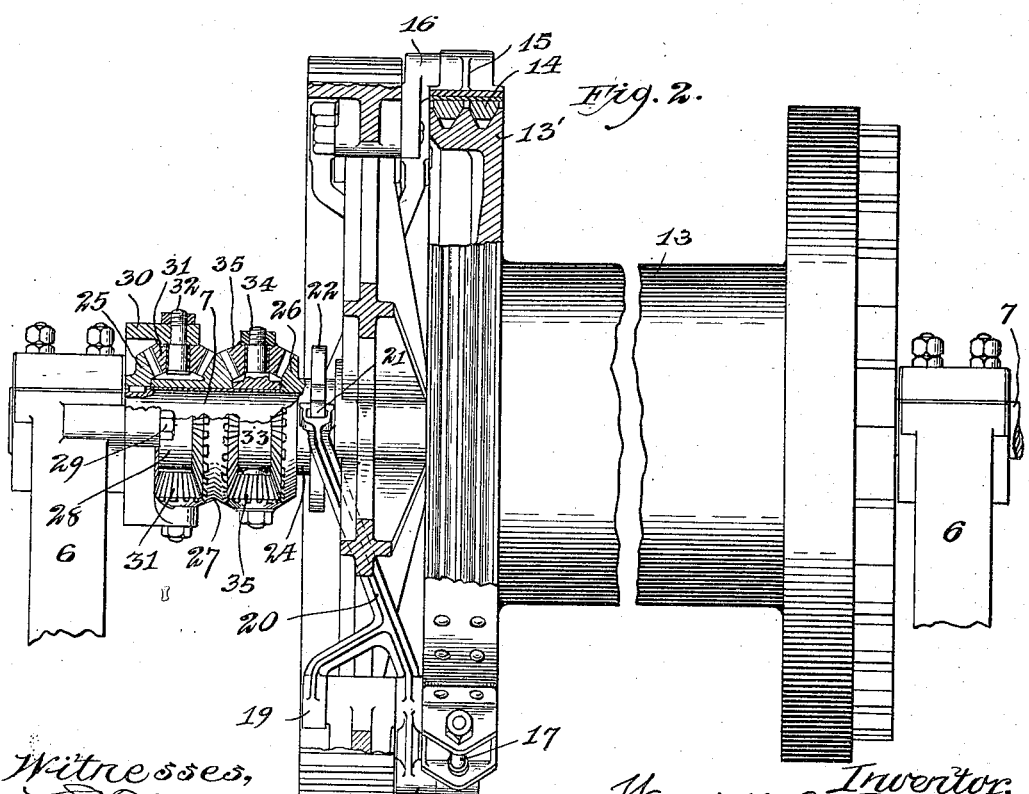
Witnesses,
Inventor,
Wendell A. Barker,
By Offield, Towle, Graves & Offield
Att'ys W. A. BARKER.
MECHANICAL MOVEMENT.
APPLICATION FILED APR. 12, 1915.
1,178,702.
Patented Apr. 11, 1916.
2 SHEETS—SHEET 2.
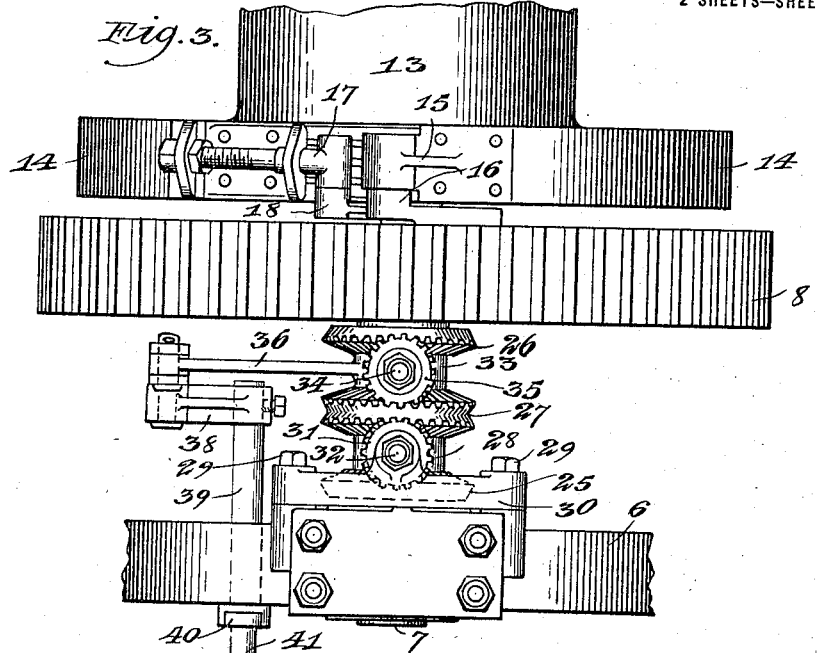
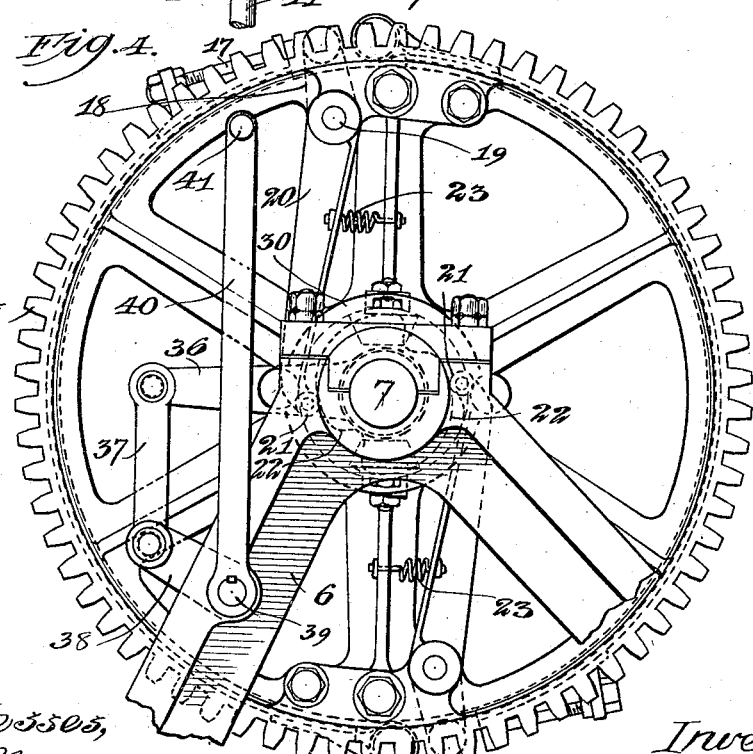

UNITED STATES PATENT OFFICE.

WENDELL A. BARKER, OF CHICAGO, ILLINOIS, ASSIGNOR TO THOMAS ELEVATOR COMPANY, OF CHICAGO, ILLINOIS, A CORPORATION OF ILLINOIS.

MECHANICAL MOVEMENT.

1,178,702.  Specification of Letters Patent.  Patented Apr. 11, 1916.

Application filed April 12, 1915. Serial No. 20,677.

*To all whom it may concern:*

Be it known that I, WENDELL A. BARKER, a citizen of the United States, residing at Chicago, in the county of Cook and State of Illinois, have invented certain new and useful Improvements in Mechanical Movements, of which the following is a specification.

My invention relates to devices for transmitting motion, and has reference more particularly to a novel gearing adapted to effect an angular adjustment or shift of a continuously rotating member during and without interrupting its rotation and either in the direction of its rotation or in the opposite direction.

The device of my invention is capable of many useful applications, that for which it has been more especially designed being in connection with hoisting machines to effect the application of a friction band or bands carried by a continuously rotating wheel or disk to the periphery of the head of a winding drum; but it will be manifest that the device of my present invention is capable of being utilized in other relations and situations where it may be desired to effect an angular advance or retardation of a continuously rotating member without interrupting the movement of the latter for any purpose whatever.

The device of my present invention has the same general character, and is designed for the same general purposes as the device forming the subject matter of Letters Patent No. 1,033,776, granted to me July 30, 1912; but provides a somewhat simpler and a more compact mechanism for accomplishing the result.

In the accompanying drawings I have illustrated a mechanical embodiment of my invention, and, in order to present one instance of its practical utility, I have shown the same as applied to the friction-clutch of a hoisting-machine to effect the application and release of the friction band to the head of the winding-drum; and referring thereto—

Figure 1 is a side elevational view of my present invention as applied to a hoisting-machine; Fig. 2 is an enlarged detail view partly in elevation broken out, and partly in vertical section, of the main driving-wheel of the machine and the clutch-operating devices actuated by the device of my present invention; Fig. 3 is a top plan view; and Fig. 4 is an enlarged side elevation of the part shown at the right of Fig. 1.

Referring to the drawings, and first briefly describing the parts of a hoisting-machine to which my present invention is shown as applied, 5 designates the machine bed carrying on either side a side frame 6, in the upper portion of which is suitably journaled a shaft 7, fast on which latter is a large spider-gear 8 driven by a pinion 9 on the armature-shaft 10 of an electric-motor indicated at 11 and controlled by an ordinary electric controller 12. Loose on the shaft 7 is the winding drum or spool 13 of the hoisting-machine. Coöperating with the head or flange 13' of the winding drum are a pair of duplicate clutch-straps 14 that are mounted on the inner face of the large gear 8; each of these straps being anchored at one end through a metal fastener 15 (Fig. 3) to a lug or bracket 16 secured to the inner face of the gear 8, and its other end being pivotally connected through an adjustable fastening member 17 to the outer end of the short arm 18 of a lever that is pivoted at 19 to the spider-gear 8 and has an inwardly extending arm 20 terminating in a bifurcated end that carries an anti-friction roller 21 (Fig. 2). The arms 20 of these levers are actuated outwardly or in a direction radial of the gear to apply the friction clutch straps to the head or flange of the drum when the latter is to be rotated by the agency of a cam disk 22 with the periphery of which the rollers 21 of the lever arms 20 engage, being preferably maintained in contact with the cam by springs 23. The cam 22 is journaled on the driving shaft 7 through the agency of a suitable hub member 24.

Turning now to those features wherein my present invention more particularly resides, 25 designates a driving bevel gear that is fast on the driving shaft 7, just inwardly of the bearing of the latter on the side frame 6. Integral with or secured to the hub 24 of the cam 22 is a driven bevel gear 26. Loosely mounted on the shaft 7 between the gears 25 and 26 is a double faced bevel gear 27, preferably formed with an extended hub 28 on one side, as clearly shown in Fig. 2. Rigidly mounted on the inner face of the side frame 6, as by bolts 29, is a box or bracket 30 that serves as a carrier for a plurality of beveled pinions 31 that are journaled on spindles 32 secured in said pinion-carrier, and mesh with the driving gear 25 and the adjacent face of the double-faced bevel gear 27.

Loose on the shaft 7 between the gears 27 and 26 is the hub 33 of a second pinion carrier, that is provided with radial spindles 34 on which are mounted a plurality of beveled pinions 35 that mesh with the other face of the gear 27, and with the driven gear 26. Integral with or secured to this second pinion-carrier, is a radially extending arm 36 that, in the arrangement here shown, is connected by the link 37 to a crank-arm 38 fast on a shaft 39, journaled in the side-frame 6; and on the outer end of said shaft 39 is keyed an upwardly extending operating arm 40 terminating in a handle 41.

In the operation of the mechanism, the driving gear 25, being keyed to the shaft 7, of course rotates with, and at the same speed as, the latter; and so long as both of the pinion-carriers are stationary, the described gear train between the driving and driven bevel gears 25 and 26 effects a rotation of the latter in the same direction, and at the same speed as the shaft 7 and the gear 25; and since the driven gear 26 is fast on the cam 22, and the large gear 8 is fast on the shaft 7, the cam 22 and large gear 8 are driven in the same direction and at the same speed, so that when thus operated the cam has no effect on the levers 20. When, however, the clutch-straps are to be applied to the drum to effect the raising or lowering of a load, and assuming that the large gear 8 is traveling in the direction indicated by the arrow in Fig. 1, the operator grasps the handle 41 and swings it in the direction indicated by the arrow, whereby an angular shift in the same direction is imparted to the pinion-carrier 33. This, in a manner well understood, accelerates or advances the driven gear 26 relatively to the shaft 7 and driving gear 25, thus shifting the cam in a counter-clockwise direction (as viewed in Figs. 1 and 4), expanding the lever arms 20, and tightening the clutch-straps on the head of the drum. A return movement of the operating arm 40 shifts the pinion-carrier 33 in the opposite direction, thus retarding the rotary movement of the cam 22 relatively to the gear 8, and thus permitting the inner ends of the lever arms 20 to swing back under the influence of springs 23 to the lower points of the cam, thereby raising the clutch-straps.

It will be noted that the gear train intermediate the driving gear 25 and driven gear 26 has the general nature or character of a differential gear train of the bevel gear type, and that this gear train as a whole is mounted on and co-axial with the driving shaft 7, thereby effecting a simple and compact arrangement requiring relatively little space, particularly in a direction radial of the shaft.

I claim:

1. In combination, a driving shaft, a bevel driving gear fast on said shaft, a bevel driven gear loose on said shaft, a differential gear train of the bevel gear type mounted on said shaft between and connecting said driving and driven gears and normally imparting to said driven gear a rotary movement in the same direction and at the same speed as said shaft, and means for effecting an angular shift of one element of said differential gear train about the axis of said shaft whereby to accelerate or retard the speed of rotation of said driven gear.

2. In combination, a driving shaft, a bevel driving gear fast on said shaft, a bevel driven gear loose on said shaft, a double faced bevel gear loose on said shaft between said driving and driven gears, a rigidly mounted pinion carrier, a plurality of bevel pinions journaled on said pinion carrier and meshing with said driving gear and with one face of said double-faced gear, a second pinion carrier, a plurality of bevel pinions journaled on said second pinion carrier and meshing with the other face of said double-faced gear and with said driven gear, and means for effecting an angular shift of said second pinion carrier about the axis of said shaft.

3. In combination, a driving shaft, a bevel driving gear fast on said shaft, a bevel driven gear loose on said shaft, a double-faced bevel gear loose on said shaft between said driving and driven gears, a rigidly mounted pinion carrier, a plurality of bevel pinions journaled on said pinion carrier and meshing with said driving gear and with one face of said double-faced gear, a second pinion carrier having a hub journaled on said shaft between said double-faced gear and said driven gear, a plurality of bevel pinions journaled on said second pinion carrier, and meshing with the other face of said double-faced gear and with said driven gear, and a manually operable device connected to said second pinion carrier for effecting an angular shift of the latter about the axis of said shaft.

W. A. BARKER.

Copies of this patent may be obtained for five cents each, by addressing the "Commissioner of Patents, Washington, D. C."